US011128527B2

(12) United States Patent
Lederer et al.

(10) Patent No.: US 11,128,527 B2
(45) Date of Patent: Sep. 21, 2021

(54) INSTALLATION SUPPORT DEVICE AND METHOD FOR INSTALLATION PROCESS SUPPORT FOR AN AUTOMATION SYSTEM

(71) Applicant: Festo SE & Co. KG, Esslingen (DE)

(72) Inventors: Thomas Lederer, Kernen (DE); Danny Schneider, Lictenwald (DE); Christian Waldeck, Esslingen (DE); Simon Frohlich, Ostfildern (DE)

(73) Assignee: FESTO SE & CO. KG, Esslingen (DE)

( * ) Notice: Subject to any disclaimer, the term of this patent is extended or adjusted under 35 U.S.C. 154(b) by 0 days.

(21) Appl. No.: 16/168,127

(22) Filed: Oct. 23, 2018

(65) Prior Publication Data
US 2019/0123958 A1   Apr. 25, 2019

(30) Foreign Application Priority Data
Oct. 24, 2017  (DE) .......................... 102017219002.7

(51) Int. Cl.
*H04L 12/24* (2006.01)
*H04L 12/28* (2006.01)

(52) U.S. Cl.
CPC ...... *H04L 41/0806* (2013.01); *H04L 12/2807* (2013.01); *H04L 41/0866* (2013.01); *H04L 41/12* (2013.01); *H04L 41/0883* (2013.01)

(58) Field of Classification Search
CPC . G06Q 50/04; H04L 12/2807; H04L 41/0806; H04L 41/0883; G06F 15/177

USPC ........................................................ 709/222
See application file for complete search history.

(56) References Cited

U.S. PATENT DOCUMENTS

| | | | |
|---|---|---|---|
| 2005/0165971 A1* | 7/2005 | Warren, Jr. ........... | G06F 3/0659 710/1 |
| 2014/0251969 A1* | 9/2014 | Stoner ...................... | B23K 9/09 219/130.21 |
| 2019/0074990 A1* | 3/2019 | Reimer ............... | H04L 12/2807 |

FOREIGN PATENT DOCUMENTS

| | | | |
|---|---|---|---|
| DE | 102012101461 | 8/2013 | |
| DE | 102015205639 A1 * | 3/2016 | ......... F24D 19/1018 |
| WO | WO2012052890 | 4/2012 | |

* cited by examiner

*Primary Examiner* — William G Trost, IV
*Assistant Examiner* — Christopher P Cadorna
(74) *Attorney, Agent, or Firm* — Hoffmann & Baron, LLP

(57) ABSTRACT

Installation support device for supporting the installation process for an automation system, with a component interface designed for communication with an automation component of the automation system, with a processing unit connected to the component interface and designed to process input signals from the component interface, with a storage module assigned to the processing unit storing a connection layout for connection of multiple automation components of the automation system, and with a display connected to the processing unit and designed to output installation information, wherein the processing unit is designed to send at least one item of installation information to the display in the event of a match between component information from the input signal and component information from the connection layout.

6 Claims, 2 Drawing Sheets

INSTALLATION SUPPORT DEVICE AND METHOD FOR INSTALLATION PROCESS SUPPORT FOR AN AUTOMATION SYSTEM

BACKGROUND OF THE INVENTION

The invention relates to an installation support device and a method for installation process support for an automation system.

WO 2012/052890 A1 discloses a method for the automatic start-up of a network with several network devices, wherein each network device has a device identifier and wherein the network devices are designed for exchanging data packets. The method comprises of the following steps: obtaining a machine-readable installation plan for the network, including physical location information for the network devices on the network; establishing the networks topology based on information describing the network which is provided by the network devices based on the data packets exchanged between the network devices; comparing the network topology established with the installation plan in order to assign physical location information to the identifier of the relevant network device.

SUMMARY OF THE INVENTION

The object of the invention is to provide an installation support device and a method for installation process support for an automation system to support a user, such as a technician charged with setting up a complex machine comprising an automation system, in the installation process.

According to a first aspect of the invention this object is achieved for an installation support device comprising a component interface designed for communication with an automation component of the automation system, a processing unit connected to the component interface and designed to process input signals from the component interface, a storage module assigned to the processing unit storing a connection layout for connection of multiple automation components of the automation system, and a display connected to the processing unit and designed to output installation information, wherein the processing unit is designed to send at least one item of installation information to the display in the event of a match between component information from the input signal and component information from the connection layout.

In principle, the installation support device is a computer, which can be designed in various forms and can be operated using a commercially available or proprietary operating system. Accordingly, the installation support device comprises a processing unit designed to perform processing operations based on a program running in the processing unit and applicable component information. Depending on the design of the installation support device, the program can either be stored in the processing unit permanently, i.e. immovably, or read at least in part from a storage module assigned to the processing unit, i.e. a writeable one.

The storage module is, in any case, designed to store the connection layout containing automation components, such as input modules, output modules, safety modules, etc., of the automation system to be installed and the communication links between the automation components. The connection layout can be read at least in part from the storage module by the processing unit in order to perform processing operations with regard to the identification of automation components based on component information or concerning the properties of communication links between automation components. The connection layout is preferably stored in a writeable area of the storage module and can be modified or replaced with another connection layout if necessary.

The installation support device also comprises a display, which can provide a user, i.e. the automation system technician, with at least one item of installation information. This installation information shall be, to give an example, a sequence of letters or numbers, i.e. a type specification, identifying the next automation component to be installed, or an installation instruction regarding the spatial arrangement of the next automation component within the automation system. Ideally, the display should be able to show graphic elements as well as letters and numbers, i.e. illustrations of the next automation component to be installed.

This makes it much easier to find the next automation component to be installed, even in complex automation systems. Specifically, the display should be designed to display the next automation component to be installed in an actual existing environment, so, for example, an image of the components of the automation system already established can be shown with the automation components to be added.

As an example, the installation support device should be a commercially available (industrial) computer from the following group: mobile telephone (smartphone), tablet computer, personal computer, laptop, desktop computer or a computer specifically designed and produced for this purpose.

In any event, the processing unit is designed, either through an appropriate arrangement of its computer architecture or by running a suitable program, to check incoming input signals at the component interface for the presence of component information. The processing unit is also designed to compare component information in the input signals with component information from the connection layout in order to be able to send installation information to the display.

As an example, the processing unit should establish, using the program being run and comparing the component information from the input signal with component information from the connection layout, which kind of automation component (or components) is connected to the installation support device via the component interface. Subsequently, with the help of the program running in the processing unit, this allows at least one item of information to be established regarding the way in which this automation component (or components) should be connected to at least one other automation component in order to form the desired automation system.

Accordingly, the installation information may, for example, consist of prompting the user to connect another automation component to the automation component(s) detected by the processing unit using the component information in order to complete the desired automation system. If the installation support device is connected to an automation component (or a group of automation components) appearing multiple times in the connection layout for the automation system, a graphic representation of the entire automation system may, for example, be shown on the display and a user may be given the option of selecting the position in which the completion of the automation system should be continued.

Alternatively, the processing unit may identify the automation component in the automation system, which is particularly suitable as a basis for completion of the automation system based on a decision matrix stored in the program, i.e. using definable optimisation criteria, without assistance from the user.

Alternatively, the installation support device user may, based on the component information detected, have an overview of multiple assembly units comprising at least two automation components combined, and decide initially which of these assembly units he/she would like to complete in the subsequent steps. This method is of interest, for example, if part of the automation system is in a functional context and/or spatial arrangement with regard to other components of a complex machine and need to be installed before the other components can be fitted.

The component information contained in the input signal may be a unique identification number for the automation components which the processing unit can use to draw conclusions regarding the nature and arrangement of these automation components in the connection layout. This is of particular interest, for example, if modelling for parameters of the individual automation components was carried out before physical construction of the automation system had even begun and these parameters were already used on the individual automation components.

Alternatively, the component information may only be a type specification for the automation components, allowing it to be directly assigned to the component information from the connection layout in the processing unit in order to establish at least one item of installation information and show it on the display.

Advantageous further developments of the invention are the subject matter of the dependent claims.

It is useful if the component interface is designed for bidirectional communication with the automation components and to provide at least one output signal from the following group: control signal, initialisation signal, parametrisation signal, read signal, command signal. The component interface's bidirectional communication capability allows individual automation components or groups of automation components to be contacted specifically by suitable output signals, which are output at the component interface.

As an example, the component interface may be used to output a control signal, which serves to execute a control process through the automation component being contacted and, for example, lead to a response from the automation components contacted, which reaches the component interface as an input signal. This response may, for example, be set up so that the automation component provides positive or negative acknowledgement of execution of the control command communicated by the control signal, allowing the installation support device processing unit to draw a conclusion regarding the attached automation component. By way of example, this permits a conclusion to be drawn regarding whether the automation component connected is indeed able to execute the control signal output at the component interface. By way of example, this can also help determine whether the automation component may be assigned a suitable user such as a solenoid valve or a sensor which can be contacted or read by the automation component using a control command in the control signal and whether the automation component can provide a corresponding result signal in the form of a response regarding a change in actuator status or in the form of a sensor signal to the component interface.

Additionally or alternatively, an initialisation signal can be output at the component interface. This can be used to prompt the automation component to perform initialisation. This is of particular interest if, as part of the initialisation of the automation component, for example, there is a connection with an output of component information which reaches the component interface as an input signal and can be passed on to the processing unit.

Additionally or alternatively, the component interface is designed to send a parametrisation signal, which specifically contains one or more parameters. If the automation component is suitable for using at least one parameter, the automation component can output a positive response to the component interface, which allows the conclusion to be drawn that at least one particular automation component type was contacted with the parametrisation signal and may also be ready for use due to the parametrisation which occurred.

Additionally or alternatively, the component interface can be designed to send a read signal aimed at inducing the automation component to output at least one item of the component information stored in the automation component. This component information then arrives at the component interface as an input signal and can be compared with component information from the connection layout in the processing unit.

Additionally or alternatively, the component interface may be designed to send a command signal, which may be, for example, a bit pattern which can be used to trigger a software function.

In a development of the invention, the component interface should be designed to supply energy from at least one automation component or to at least one automation component. This makes it particularly convenient to complete the automation system, as it enables direct energy supply to the automation component added when adding automation components. This also ensures that a direct communication link can be made between the newly added automation component and the installation support device, which can be used to determine, specifically in a subsequent step, the component information for the newly added automation component.

In a configuration of the invention, the component interface is designed for wireless communication with at least one automation component. In that event, it must be assumed that an energy supply independent of the installation support device is designated to the automation component and that the automation component can be contacted by the installation support device as part of a wireless communication process. This kind of wireless communication may take place i.e. by means of electromagnetic waves, i.e. radio waves or light waves. This kind of wireless communication is of particular interest if the installation support device is designed in the form of a commercially available mobile phone or tablet computer and yet does not comprise any planned energy source and/or cable interface to supply sufficient quantities of electrical energy to at least one automation component. By way of example, wireless bidirectional communication may occur by means of infrared data transfer, i.e. in accordance with the IrDA standard, or wireless communication in accordance with the Bluetooth protocol or a nearfield communication (NFC) using RFID technology.

In a development of the invention, the installation information should contain at least one item of information from the following group: type of the next automation component to be connected, cable length for the next automation component to be connected, cable type for the next automation component to be connected, cable socket for connecting the next automation component to be connected. Ideally, a representation of the installation on the display will be selected that allows a user the most reliable choice of the next automation component to be connected. This may be, in particular, a graphic representation of the automation component. When depicting the cable type to be used, an enlarged display of the cable's plug connectors may be combined with clear information regarding the cable length. A cable socket for connecting the next automation component to be connected can also be shown in an enlarged display of at least one section of the automation component to which the cable should be connected.

According to a second aspect of the invention, the object of the invention is achieved through a method for installation process support for an automation system comprising the following steps: preparing a connection layout that describes the connection of a number of automation components of an automation system to a processing unit of an installation support device, producing a communication link between the installation support device and a first automation component, reading at least one item of component information from the first automation component, using the processing unit to perform a comparison between the component information determined and the connection layout, in order to locate the automation component detected in the connection layout, using the processing unit to detect a second automation component intended to connect to the first automation component in order to implement the connection layout, displaying the second automation component on a display on the installation support device, attaching the second automation component to the automation system.

According to an improvement of the method, an output signal from the following group should be sent by the installation support device once the second automation component is added to the automation system: control signal, initialisation signal, parametrisation signal, read signal, command signal, and the signal response to the output signal should be evaluated in order to conduct an inspection of a communication link between the first and second automation components and show an inspection result determined by the processing unit based on the connection layout on the installation support device display and/or with at least one status display of at least one of the automation components. In this procedural step, the focus is therefore on the inspection of the previous step by a user. Accordingly, a suitable output signal is sent from the installation support device at the communication interface, which is transferred via the first automation component to the second automation component, in order to cause a reaction there in the form of a signal response which is transferred to the installation support device by interconnecting the first automation component. A comparison is made there in the processing unit with the expectation stored for the relevant automation component, which can be found in the connection layout. With the help of evaluation of the output signal output by the installation support device in the installation output device it is also possible to conduct an inspection of a cable connection between the first and second automation components. For this purpose, by way of example, it is possible to determine the time the output signal needs to travel from the installation support device to the second automation component back to the installation support device. Additionally or alternatively, it is hereby also possible to determine an attenuation of the output signal output by the installation support device in order to draw conclusions regarding the cable type and/or length used and enable a comparison with the connection layout.

Alternatively, in the case of wireless communication between the installation support device and automation components, it is also possible to contact the newly added second automation component directly through the installation support device and directly transmit the signal response of the newly added second automation component to the installation support device in order to inspect the signal response using the connection layout there.

In addition or as an alternative to showing the result of the inspection on the installation support device display, it may be possible, where necessary, to show the result of the inspection on a status display of at least one of the automation components, i.e. the newly added automation component. This display may be, by way of example, a light indicator, i.e. an LED, or a graphics-capable display.

It is useful in case of a match between the signal response to the output signal and the connection layout if the second automation component is defined as part of the first automation component and the steps of the method according to the invention are repeated. If the processing unit establishes a match between signal response and expected value from the connection layout, it forms a new first automation component for continuing the method, which comprises a combination of the original first automation component with the newly added second automation component. It is then possible to follow the procedural steps for the addition of another second automation component. The internal connection of the previous second automation component with the previous first automation component is only intended for the processing unit's internal purposes and is also irrespective of whether these two components form an assembly unit or are arranged separately. For the processing unit and the program it runs, all that matters is which other automation components should be connect with the hitherto already connected automation components.

In a further development of the method, the second automation component should be added to the automation system during operation of the first automation component, wherein the first automation component is supplied with electricity and has a communication link with the installation support device. Accordingly, it is not necessary to disconnect the automation system to add further automation components. Other automation components can be added in 'hotplug' or 'hotswap' mode instead. Electric circuits of the respective automation components and any planned programs for these electric circuits are hereby prepared for use in 'hotplug' or 'hotswap' mode. Ideally, the automation components, which are already installed, should help supply the new automation component with electricity.

In further development of the invention, if there is a deviation between the signal response and the connection layout, a deviation message is shown on the installation support device display and the user is prompted on the installation support device to reject or confirm the deviation of the installation support device, wherein if they reject it, a message regarding replacement of the second automation component added is shown on the display of the installation support device, wherein if they confirm it, the component information from the second automation component is accepted into the connection layout and the method steps according to the invention are repeated.

Accordingly, the method enables dynamic adjustment of the connection layout, providing the user confirms acceptance of the component information, once a deviation between the signal response and connection layout has initially led to a deviation alert on the display. Ideally, there should be an automatic inspection before the output of the deviation alert on the installation support device display to check whether the deviating automation component is suitable for use in the position within the connection layout. The installation support device can consult an internal or external database, i.e. a database contacted online, containing relevant information on compatibility.

If the database query should reveal that the automation component inserted cannot be used at the relevant position in the connection layout, a corresponding error message is shown on the display of the installation support device, along with a prompt to replace the second automation component added.

In the event of confirmation of acceptance of the component information for the second automation component, the suitably modified connection layout can be saved with a different name in the storage module of the installation support device and, where necessary, archived once the automation system is created and/or exported in a suitable file format. Additionally or alternatively, additional information on the alternative automation component may be shown on the display. This applies in particular to restrictions in the scope of use of the alternative automation component, by way of example, with regard to later development options or use in a safety system.

BRIEF DESCRIPTION OF THE DRAWINGS

An advantageous embodiment of the invention is illustrated in the drawings, wherein.

DETAILED DESCRIPTION

Figure 1:
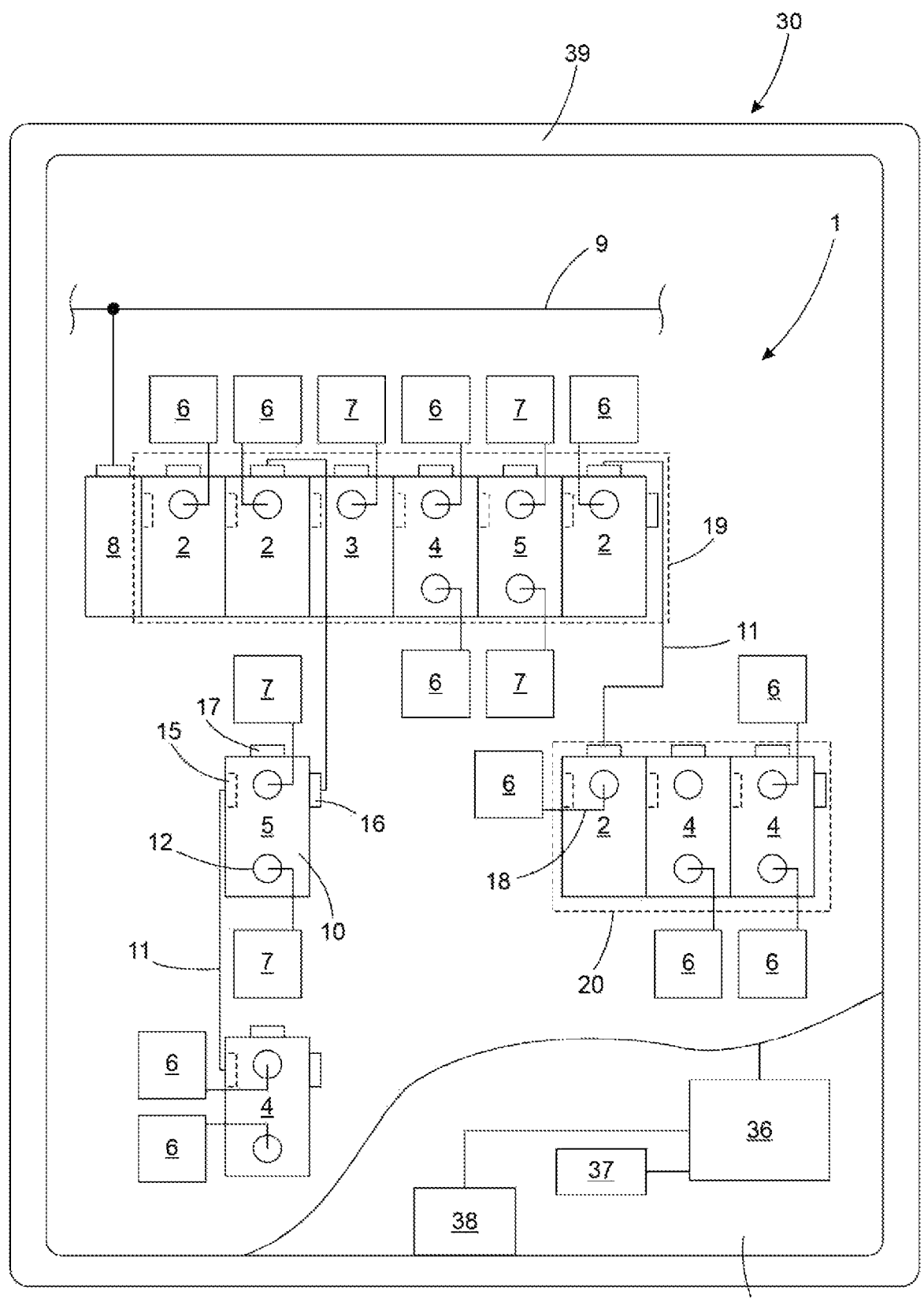
FIG. 1 shows a purely schematic representation of an installation support device with a connection layout shown on a display for an automation system built from numerous automation components.

A purely schematic depiction of an installation support device 30 in FIG. 1 is a tablet computer which, by way of example, comprises a touch-sensitive screen acting as display 33 and input device 34, across the entire front shown in FIG. 1 and extending to the surrounding edge 39. The installation support device 30 also comprises a computer board 35 behind the display 33, fitted with a processor acting as processing unit 36, a memory chip acting as storage module 37 and a component interface 38. Usually component interface 38 is a USB interface (universal serial bus interface) so that, where necessary for communication with automation component 2, a suitable converter or signal transformer must be integrated into the cable connection between the installation support device 30 and the automation component 2. This converter can be used for signal/protocol transformation and/or level adjustment. The computer board 35 also comprises a unspecified graphics processor (not shown) to control the display 33 and an also unspecified screen processor for handling the touch sensitive screen and sending input signals to processing unit 36.

For purely illustrative purposes, a connection layout for an automation system 1 is shown on the display 33 of the installation support device 30. Its components are described in further detail below only by way of example for automation systems with different configurations.

The automation system 1 shown on the display 33 comprises multiple different automation components 2, 3, 4, 5, which can either be electro-mechanically connected in a direct sequence or arranged separately, wherein there should then be a cable connection between the automation components 2 to 5, by way of example. By way of example, the automation component 2 also known as the output module is intended to control a solenoid valve 6 only shown schematically. The automation component 3 also known as the input module is, by way of example, designed to scan a sensor 7. Automation components 4 and 5 are designed to control two solenoid valves 6 or scan two sensors 7 respectively.

Automation system 1 also comprises, for purely illustrative purposes, a bus coupler 8 connected to an automation component 2 with a communication link with automation component 2 and a bus cable 9. By way of example, there should be communication between automation components 2 to 5 via an unspecified proprietary internal bus protocol, while communication takes place with unspecified bus users connected to bus cable 9 via bus coupler 8 using a standard fieldbus system.

Each of the automation components 2 to 5 comprises a purely illustrative rectangular housing 10, wherein automation components 2 to 5 which are not connected in a direct sequence to other automation components 2 to 5 are in communication with other automation components 2 to 5 via connection cable 11. To connect a solenoid valve 6 or sensor 7, each of the automation components 2 to 5 comprises at least one device interface 12 which, for example, should act in an unspecified way as a socket for an unspecified connection cable attached to solenoid valve 6 or sensor 7.

The housing 10 of the automation components 2 to 5 comprises three plug connectors 15, 16, 17 which serve as a communication link with at least one other automation component 2 to 5. A plug connector 15 of an automation component 2 to 5 is designed as a socket and ideally accepts a plug connector 16 designed as a plug for another automation component 2 to 5 to be attached sequentially. Plug connector 17 is ideally intended for coupling with a connection cable 11, wherein this connection cable 11 can be connected to another automation component 2 to 5 depending on design with one of the plug connectors 15 to 17.

The connection layout for automation system 1 shown on display 33 can, by way of example, be produced, with the help of a computer-aided construction model, for a complex machine which requires automation components 2 to 5 as shown in FIG. 1 to perform its functions. As the building of this kind of automation system 1 involves a considerable degree of difficulty due to the number of components, the function of the installation support device 30 is not limited to the presentation of the automation system 1 shown in FIG. 1. Instead, it comprises a step-by-step guide for building automation system 1 as is shown in FIG. 2 purely schematically.

Figure 2:
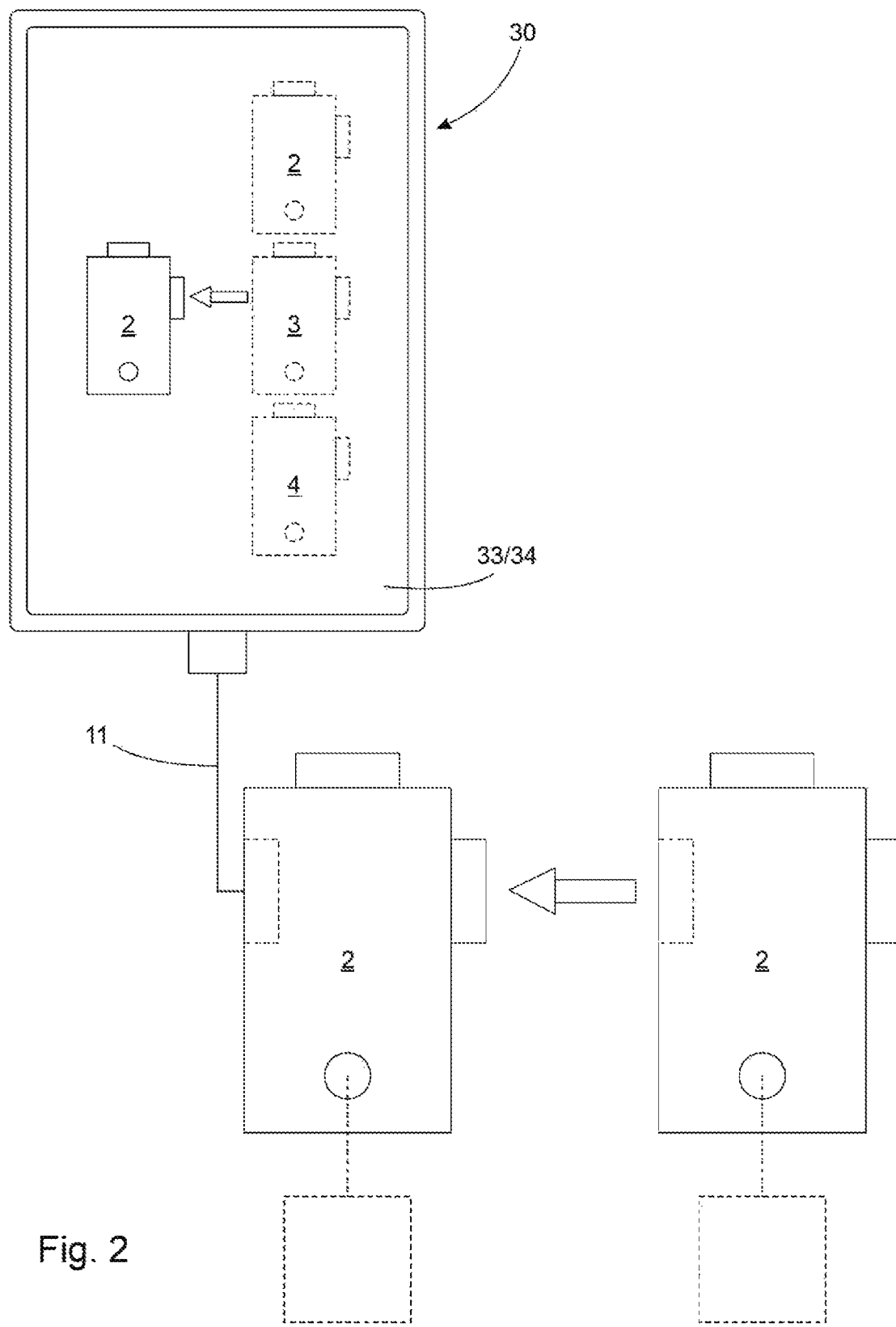
FIG. 2 shows the installation support device coupled with a first automation component, specifying the attachment of a second automation component on the display.

In FIG. 2, the installation support device 30 is connected for purely illustrative purposes with an automation component 2 via component interface 38 using a connection cable 11. As automation system 1 comprises of multiple automation components 2 according to FIG. 1, the user may be establish, by choosing one of the automation components 2 on the layout plan according to FIG. 1, which of the automation components 2 should be used to begin building automation system 1.

Alternatively, it may be established by a specification already stored in the layout plan that the building of automation system 1 must take place using a specific automation component 2 from the group of automation components 2.

Additionally or alternatively, the installation support device 30 may need to provide the user with additional information regarding the tools (screwdriver, wrench, etc.)

to use to combine the automation components 2 and/or installation specifications such as the torque for tightening screws etc.

As an additional version, the user may be shown multiple options on display 33 after coupling the installation support device 30 to automation component 2. These comprise the options for connecting additional automation components 2 to 5 so that the user can specify a restriction for the further building of automation system 1 solely by attaching the additional automation components 2 to 5 to automation component 2, without having to input this into the installation support device 30. This approach should, as an example, be explained on automation 1 according to FIG. 1, in which for purely illustrative purposes there is a total of two assembly units 19, 20 built from several directly sequentially arranged automation components 2 to 5.

In that case, for example, the following method may be established: following the establishment of a connection between installation support device 30 and automation component 2, processing unit 36 sends a read signal to automation component 2 via component interface 38 and connection cable 11. It is assumed in this instance that a power supply of automation component 2 is ensured by installation support device 30 via connection cable 11. Accordingly, automation component 2 can generate a signal response when the read signal is received. This response is sent back via connection cable 11 to the component interface 38, which also acts as the input interface, and is sent to the processing unit 36 from there. As an example, the signal response comprises a type specification for automation component 2 which can be extracted by the processing unit 36 as component information from the input signal and compared with the type specifications of all automation components 2 to 5 planned for automation system 1. As a result of this comparison, the processing unit 36 establishes that the automation component contacted is an automation component 2. Thus, by comparison with the connection layout as shown in FIG. 1, the user can be shown for purely illustrative purposes a total of three different automation components 2 to 4 on display 33 which, according to the connection layout, can be arranged in a direct sequence going right of automation component 2.

The signal response of automation component 2, which can be extracted by processing unit 36 as component information from the input signal, may also contain an individual serial number of automation number 2 which is written in a protocol file for documentation purposes, in which all serial numbers of installed automation components 2 are listed after installation accordingly.

For reasons of clarity, FIG. 2 does not show other options, such as the sequential arrangement of automation components 2 to 5 to the left or connecting other automation components via connection cable 11. As can be extrapolated from what is shown in FIG. 1, for purely illustrative reasons, automation component 2 can be connected optionally within assembly unit 19 with another automation component 2 or an automation component 3. Alternatively, automation component 2 can be connected to an automation component 4 according to the arrangement in assembly unit 20.

Irrespective of the way the next automation component 2 to 5 to be attached to automation component 2 is chosen, the installation support device 30 is designed to provide, at a certain point in time, for example in regular intervals or following active input from a user, a read signal to the component interface 38, which is sent to the first automation component 2 via the connection cable 11 and then passed on to a second automation component 2 from that point. Here, it must be assumed that the first automation component 2 which received a corresponding read signal at the beginning of the installation process is configured to pass on the read signal to the newly connected automation components 2 to 5. The read signal reaching the second automation component 2 there leads to a signal response which is sent to the component interface 38 via the first automation component 2 and the connection cable 11.

From that point, the signal response is passed on to processing unit 36, which can extract component information for the second automation component 2 using the type specification in the signal response and compare said information to the connection layout in FIG. 1. The processing unit 36 can use this to draw the ultimate conclusion that arranging the second automation component 2 to the first automation component 2 began the construction of assembly unit 10. Then, in a subsequent processing step, the second automation component 2 is assigned to the first automation component 2 in order to determine the next automation component 3 to be sequentially arranged using the connection layout according to FIG. 1. Accordingly, on display 33, unlike as shown in FIG. 2, next to automation component 2, automation component 3 is shown without detail. As in assembly unit 19, a clearly identifiable part of assembly unit 19 was added in the connection of both automation components 2 described above, there is therefore also no choice. Instead, the automation component 3 must be sequentially arranged as the next item to the previously fitted automation component 2.

By way of example, the installation support device 30 may be fitted with, i.e. via component interface 38, a playable software that can be stored on storage module 37 and used by processing unit 36 enabling the processes described above for arranging the different automation components 2 to 5.

Additionally, this software may be designed to supply individual automation components 2 to 5 or all automation components 2 to 5 with parameters or parameter sets to ensure that these can be operated advantageously as parts of the automation system with the connected components, i.e. valves 6 and sensors 7 in particular.

Additionally or alternatively, the software may be designed to perform function tests of individual automation components 2 to 5 or assembly units 19, 20 or the entire automation system 1, wherein control commands are sent from the installation support device 30 to the automation components 2 to 5 which correspond to commands how they can be provided to automation components 2 to 5 either via bus cable 9 and bus couple 8 or via a control device not shown belonging to the automation system 1.

The software may also be designed to show information on connection cables to be used between automation components 2 to 5 on the display 33 and/or where necessary graphically depict the course of a connection cable 11 as long as this course is set out in a cabling plan not shown assigned to the connection layout as shown in FIG. 1.

Additionally or alternatively, the software may also be designed to show a stored image or model of the complex machine (virtual reality) or an image produced by an integrated or external camera (augmented reality) of the already attached automation components 2 to 5 of automation system 1, particularly in conjunction with the complex machine to be equipped with automation system 1. This allows the user to receive specific information regarding which next automation component 2 to 5 should be connected where and how this automation component 2 to 5 should be connected to the existing automation components 2 to 5.

Additionally or alternatively, the software may also be designed for voice input of user commands and/or user queries and to evaluate incoming user commands either locally or by request through an external voice recognition server and execute commands recognised from the voice input.

The invention therefore also concerns a computer program for use in an installation support device, i.e. in the form of a mobile telephone (smartphone), tablet computer or laptop, wherein the computer program is set up in such a way that, when used in the processing unit of any such installation support device, it can compare a connection layout permanently stored or externally added with an input signal from a component interface in order to compare component information between the input signal and connection layout and, in the case of a match between the component information from the input signal and the connection layout, provide at least one item of installation information to an installation support device display.

What is claimed is:

1. A method for installation process support for an automation system, the method comprising:
   preparing a connection layout that describes the connection of a number of automation components of an automation system to a processing unit of an installation support device, the connection layout containing information directed to the automation components of the automation system to be installed and information directed to communication links between the automation components;
   producing a communication link between the installation support device and a first automation component;
   reading at least one item of component information from the first automation component, the component information being provided solely by the first automation component without user input;
   using the processing unit to perform a comparison between the component information determined and the connection layout, in order to locate the automation component detected in the connection layout;
   using the processing unit to detect a second automation component intended to connect to the first automation component in order to implement the connection layout;
   displaying the second automation component on a display on the installation support device;
   attaching the second automation component to the automation system;
   providing an output signal by the installation support device once the second automation component is added to the automation system, wherein the output signal is selected from the following group: control signal, initialization signal, parametrization signal, read signal, command signal;
   evaluating a signal response to the output signal in the processing unit by comparing the output signal with an expectation stored for the second automation component, which can be found in the connection layout; and
   displaying a deviation message on the display of the installation support device if there is a deviation between the signal response and the connection layout.

2. The method according to claim 1, wherein the signal response to the output signal is evaluated in order to conduct an inspection of a communication link between the first and second automation components and an inspection result determined by the processing unit based on the connection layout is shown on the installation support device display and/or with at least one status display of at least one of the automation components.

3. The method according to claim 2, wherein, in case of a match between the signal response to the output signal and the connection layout, the second automation component is defined as part of the first automation component and the steps of the method are repeated.

4. The method according to claim 1, wherein the second automation component is added to the automation system during operation of the first automation component, wherein the first automation component is supplied with electricity and has a communication link with the installation support device.

5. The method according to claim 2, wherein the user is prompted on the installation support device to reject or confirm the deviation of the installation support device, wherein if the deviation is rejected, a message regarding replacement of the second automation component added is shown on the display of the installation support device, wherein if the deviation is confirmed, the component information from the second automation component is accepted into the connection layout and the method steps are repeated.

6. The method according to claim 1, wherein a bidirectional communication link is established between a component interface of the installation support device and the first automation component, and wherein the method further comprises:
   sending a read signal from the component interface of the installation support device to induce the automation components to provide input signals comprising component information, wherein at least one of the input signals comprising at least one item of component information is read from the first automation component.

* * * * *